United States Patent
Yoshida et al.

(12) 
(10) Patent No.: US 10,618,208 B2
(45) Date of Patent: Apr. 14, 2020

(54) METHOD FOR PRODUCING SHOCK ABSORBING MEMBER

(71) Applicant: Mizuno Corporation, Osaka (JP)

(72) Inventors: Yohei Yoshida, Osaka (JP); Kouji Ito, Osaka (JP)

(73) Assignee: MIZUNO CORPORATION, Osaka (JP)

( * ) Notice: Subject to any disclaimer, the term of this patent is extended or adjusted under 35 U.S.C. 154(b) by 0 days.

(21) Appl. No.: 16/224,085

(22) Filed: Dec. 18, 2018

(65) Prior Publication Data

US 2019/0184613 A1 Jun. 20, 2019

(30) Foreign Application Priority Data

Dec. 19, 2017 (JP) ................. 2017-243130

(51) Int. Cl.
| | |
|---|---|
| B29C 45/14 | (2006.01) |
| A43B 13/18 | (2006.01) |
| A43B 21/32 | (2006.01) |
| B29L 31/50 | (2006.01) |
| B29K 77/00 | (2006.01) |
| B29K 75/00 | (2006.01) |

(52) U.S. Cl.
CPC ...... *B29C 45/14467* (2013.01); *A43B 13/183* (2013.01); *A43B 13/187* (2013.01); *A43B 21/32* (2013.01); *B29C 2045/1454* (2013.01); *B29K 2075/00* (2013.01); *B29K 2077/00* (2013.01); *B29L 2031/504* (2013.01)

(58) Field of Classification Search
None
See application file for complete search history.

(56) References Cited

U.S. PATENT DOCUMENTS

| | | | |
|---|---|---|---|
| 7,708,923 B1 * | 5/2010 | Helicke | B29C 45/14598 264/261 |
| 8,146,270 B2 | 4/2012 | Aveni et al. | |
| 2003/0205842 A1 * | 11/2003 | Lee | A63H 3/46 264/242 |
| 2010/0192407 A1 | 8/2010 | Aveni et al. | |
| 2011/0005100 A1 | 1/2011 | Smaldone et al. | |

FOREIGN PATENT DOCUMENTS

DE 202012101767 U1 10/2013

OTHER PUBLICATIONS

Japanese Office Action issued in related application No. JP2017-243130 dated Aug. 6, 2019.

\* cited by examiner

*Primary Examiner* — Edmund H Lee
(74) *Attorney, Agent, or Firm* — Troutman Sanders LLP; Daniel Sharpe

(57) ABSTRACT

A method for producing the shock absorbing member includes: inserting in which each of tubes is housed in a corresponding one of first housings such that molding spaces and the tubes communicate with one another; and molding in which a thermoplastic resin material to form a connection member is heated to melt and injected from a gate toward the molding spaces and the tubes so that the tubes and the connection member are integrally formed.

12 Claims, 15 Drawing Sheets

METHOD FOR PRODUCING SHOCK ABSORBING MEMBER

CROSS-REFERENCE TO RELATED APPLICATION

This application claims priority to Japanese Patent Application No. 2017-243130 filed on Dec. 19, 2017, the entire disclosure of which is incorporated by reference herein.

BACKGROUND

The present disclosure relates to a method for producing a shock absorbing member for a sole of a shoe.

A shock absorbing member known in the art for a sole of a shoe is disclosed, for example, in U.S. Pat. No. 8,146,270. The shock absorbing member includes: a pair of walls spaced fore and aft from each other and elastically deformable in a fore-aft direction of a shoe by external force in a vertical direction; and a spring member elastically deformable and connecting together the pair of walls provided fore and aft (see FIG. 5B). Each of the walls has a substantially center portion in a vertical direction formed to curve and protrude toward the front or the rear of the shoe. Moreover, each wall has an interior wall face provided with a recess in a substantial center of the interior wall face in the vertical direction. The recess extends in the foot width direction of the shoe. Furthermore, the spring member is shaped into a flat plate so that each of a front end and a rear end, of the spring member, shaped in a substantially oval shape in cross-section fits into a corresponding one of the recesses on the walls, and stretches fore and aft.

In the shock absorbing member cited in U.S. Pat. No. 8,146,270, each of the walls elastically deforms by external force in the vertical direction, and, in response to the elastic deformation of each wall, the substantially center portion of the wall in the vertical direction moves toward the fore-aft direction of the shoe. Simultaneously, the spring member is pulled fore and aft while both ends of the spring member fit into the recesses, and elastically deforms. Meanwhile, when the external force in the vertical direction disappears, resilience of each of the walls and spring member causes the shock absorbing member to return to the original state. This exerts shock absorbing properties and repulsive force.

However, the ends of the spring member merely fit into the recesses of the walls. Hence, when the walls elastically deform significantly by relatively large external force, the spring member excessively stretches. As a result, both ends of the spring member might inevitably come off the recesses of the walls. Specifically, it would be difficult to stably hold the spring member against the walls. The shock absorbing member cited in U.S. Pat. No. 8,146,270 requires an operation to separately assemble each of the walls and the spring member. Such an operation makes it difficult to produce a robust shock absorbing member.

SUMMARY

The present disclosure is conceived in view of the above problems and intends to provide a robust shock absorbing member for a sole of a shoe in a stable and simple manner.

In order to achieve the above intention, a first aspect of the present disclosure is directed to a method for producing a shock absorbing member for a sole of a shoe. The shock absorbing member includes: tubes spaced from one another; and a connection member inserted through and laid across the tubes, and connecting the tubes together. A mold apparatus for producing the shock absorbing member includes first housings capable of housing the tubes with the tubes spaced from one another; molding spaces each formed between the first housings and extending to communicate with the tubes with the first housings housing the tubes; and a gate communicating with the molding spaces. The method for producing the shock absorbing member includes: inserting in which each of the tubes is housed in a corresponding one of the first housings such that the molding spaces and the tubes communicate with one another; and molding in which a thermoplastic resin material to form the connection member is heated to melt and injected from the gate toward the molding spaces and the tubes so that the tubes and the connection member are integrally formed In this first aspect, the inserting facilitates communication between the molding spaces and the tubes in the mold apparatus. As a result, in the molding, the tubes and the connection member can be integrally formed accurately while the positional relationship between the tubes and the connection member can be stably maintained in the mold apparatus. Moreover, in the molding, the tubes and the connection member are integrally formed, eliminating the need of separately assembling the tubes and the connection member. In addition, the integral forming easily achieves a structure in which the connection member is hard to come off the insides of the tubes even if the connection member is not secured to the tubes with, for example, an adhesive. Hence, the first aspect makes it possible to easily obtain, in a stable manner, a robust shock absorbing member.

In a second aspect of the first aspect, the shock absorbing member may further include one support member. The support member may be integrally formed with the tubes spaced from one another along a circumference of the support member. The mold apparatus may further include a second housing for housing the support member. In the inserting, each of the tubes may be housed in a corresponding one of the first housings and the support member may be housed in the second housing, such that the molding spaces and the tubes may communicate with one another.

This second aspect makes it possible to easily obtain, in a stable manner, the shock absorbing member including the support member.

In a third aspect of the first aspect, the shock absorbing member may further include support members. The support members may be integrally formed with at least one of the tubes. The mold apparatus may further include third housings for housing the support members. The third housings may be arranged in the mold apparatus, and spaced from one another via the molding spaces along a circumference of the mold apparatus. In the inserting, each of the tubes may be housed in the corresponding one of the first housings and each of the support members may be housed in a corresponding one of the third housings, such that the molding spaces and the tubes may communicate with one another.

This third aspect makes it possible to easily obtain, in a stable manner, the shock absorbing member including the support members.

In a fourth aspect of the first aspect, each of the first housings may be provided with holding components capable of holding both ends of a corresponding one of the tubes. In the inserting, each of the tubes may be housed in a corresponding one of the first housings while both ends of each of the tubes are held by the holding components, such that the molding spaces and the tubes may communicate with one another.

This fourth aspect allows the both ends of each tube to be stabilized in the mold apparatus, making it possible to accurately communicating the molding spaces with the tubes.

In a fifth aspect of the first aspect, the molding spaces may communicate with the tubes and define a closed loop. In the molding, the tubes and the connection member may be integrally formed together while the connection member may be inserted through the tubes, and formed in a closed loop with ends of the connection member having no seams.

In this fifth aspect, even if the connection member elastically deforms by the external force, the above features make it possible to easily obtain, in a stable manner, the robust shock absorbing member in which the connection member is hard to come off the insides of the tubes.

In a sixth aspect of the first aspect, the connection member may extend, and may be open between the tubes each positioned at one of ends of the shock absorbing member. The connection member may have ends each having a retainer (i) provided outside of one of the tubes each positioned at one of the ends of the shock absorbing member, and (ii) having an outer diameter larger than an inner diameter of the tubes. The mold apparatus may further include retainer molding spaces each provided outside of one of the first housings housing the tubes each positioned at one of the ends of the shock absorbing member. In the molding, the thermoplastic resin material may be injected toward the retainer molding spaces to mold the retainer.

In this sixth aspect, the molding makes it possible to easily obtain the shock absorbing member in which the connection member in a non-closed loop is hard to come off the tubes each positioned in either end of the shock absorbing member.

In a seventh aspect of the first aspect, the tubes may be made of a material higher in rigidity than the thermoplastic resin material.

In this seventh aspect, the tubes are made of a material higher in rigidity than the thermoplastic resin material included in the connection member. Such a feature makes it possible to easily obtain, in a stable manner, the shock absorbing member having shock absorbing properties and repulsive force.

In an eighth aspect of the first aspect, the tubes may be made of a material having a melting point higher than a molding temperature of the thermoplastic resin material.

In this eighth aspect, the tubes are made of a material having a melting point higher than a molding temperature of the thermoplastic resin material included in the connection member. Such a feature reduces the risk that the tubes melt in the molding, so that the shock absorbing member can be easily obtained in a stable manner.

In a ninth aspect of the second aspect or the third aspect, the support member is made of a material higher in rigidity than the thermoplastic resin material.

In this ninth aspect, the support member is made of a material higher in rigidity than the thermoplastic resin material included in the connection member. Such a feature makes it possible to easily obtain, in a stable manner, the shock absorbing member having shock absorbing properties and repulsive force.

In a tenth aspect of the second aspect or the third aspect, the support members are made of a material having a melting point higher than a molding temperature of the thermoplastic resin material.

In this tenth aspect, the support member is made of a material having a melting point higher than a molding temperature of the thermoplastic resin material included in the connection member. Such a feature reduces the risk that the support member melts in the molding, so that the shock absorbing member can be easily obtained in a stable manner.

As can be seen, the present disclosure makes it possible to easily obtain, in a stable manner, a robust shock absorbing member.

DETAILED DESCRIPTION

Embodiments of the present disclosure will now be described in detail with reference to the drawings. Note that the following description of the embodiments is a mere example in nature, and is not intended to limit the scope, application, or uses of the present disclosure.

[First Embodiment]

Figure 1:
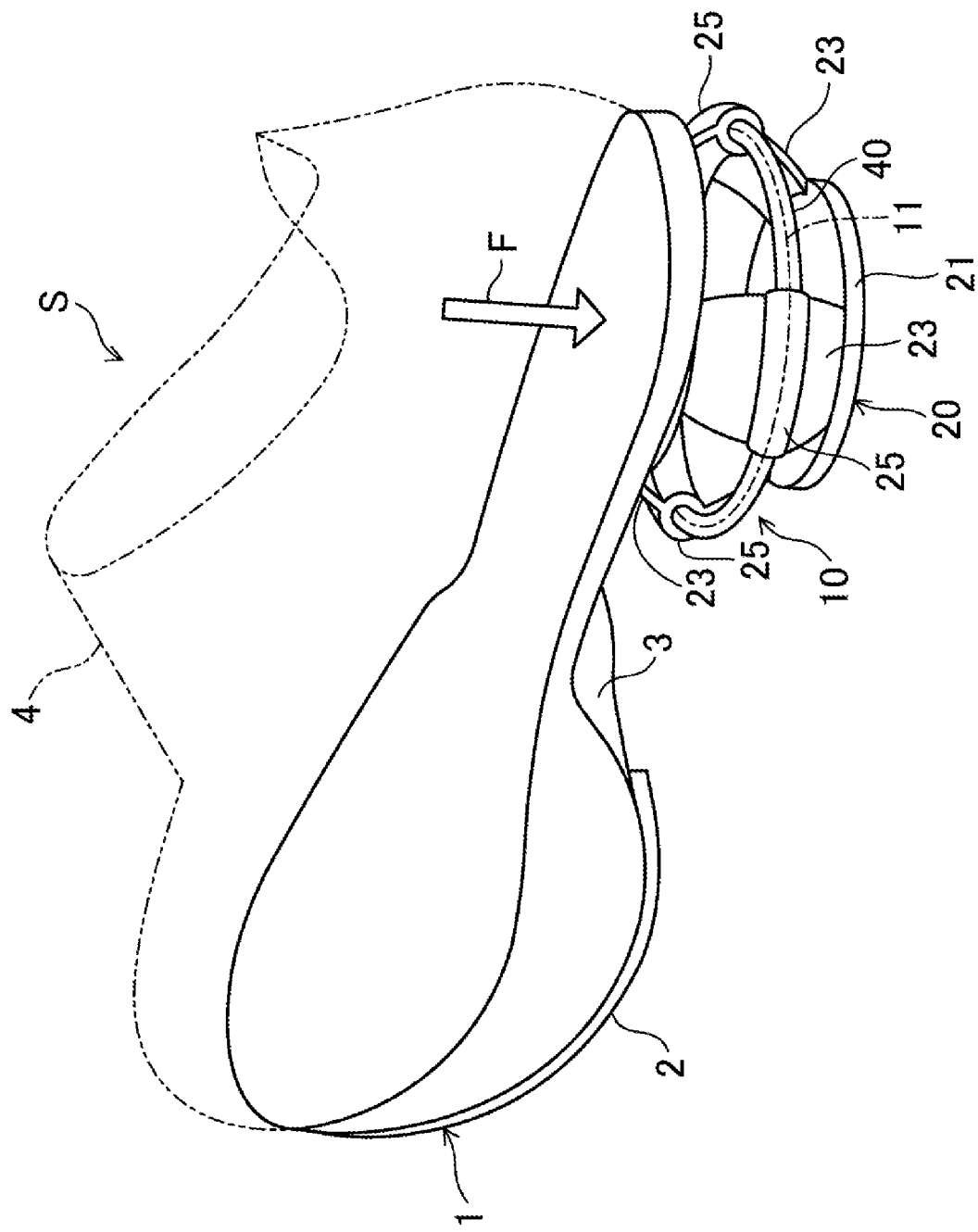
FIG. 1 is an overall perspective view of a shoe including a shock absorbing member according to a first embodiment of the present disclosure.

FIG. 1 illustrates a general view of a shoe S including a shock absorbing member 10 according to a first embodiment of the present disclosure. The shoe S is applied to, for example, sport shoes used in various kinds of sports such as running and ball games, sneakers for daily use, and shoes for rehabilitation.

The drawings illustrate a right shoe S only as an example. Since the left shoe is symmetrical to the right shoe, only the right shoe will be described in the following description, and the description of the left shoe will be omitted herein.

In the following description, the expressions "above," "upward," "on," "upper," "below," "under," "lower," and "downward," represent the vertical positional relationship between respective parts of the shoe S, and "front," "fore," "rear," and "hind" represent the longitudinal positional relationship between respective parts of the shoe S.

As shown in FIG. 1, the shoe S has a sole 1. The sole 1 includes an outsole 2 extending over a region from the forefoot to the midfoot of a foot of a person wearing the shoe S (hereinafter referred to as the "wearer"). The sole 1 further includes a midsole 3 which supports the wearer's plantar surface extending from the forefoot to the hindfoot. An upper 4 (see phantom lines in FIG. 1) configured to cover the wearer's foot is attached to the peripheral edge of the midsole 3.

(Shock Absorbing Member)

As shown in FIG. 1, the shoe S has a shock absorbing member 10. This shock absorbing member 10 is for (i) absorbing shock generated when external force F in the vertical direction is applied to the sole 1, and, while absorbing the shock, (ii) converting distortion energy stored inside the shock absorbing member 10 into repulsive force to provide the repulsive force to the foot of the wearer. In this embodiment, the shock absorbing member 10 is provided to the rear of the sole 1. Specifically, the shock absorbing member 10 is provided in a position, in the sole 1, corresponding to the heel of the wearer's foot.

Figure 2:
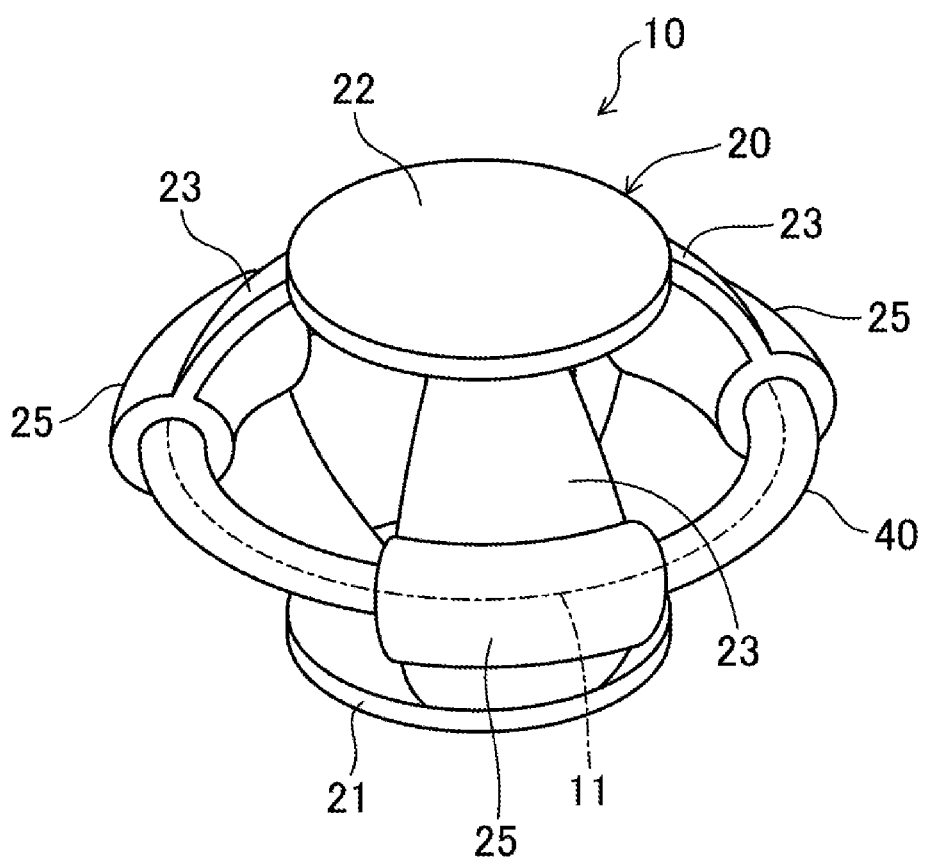
FIG. 2 is a perspective view illustrating a shock absorbing member according to the first embodiment of the present disclosure, as viewed from above.

The shock absorbing member 10 has an outer periphery portion formed to be substantially circular or annular when observed in plan view. In the description below, annular broken lines in each of FIGS. 1 and 2 are seen as an outer periphery portion 11 for the sake of simplification of illustration of the outer periphery portion 11. Furthermore, the outer periphery portion 11 of each of FIGS. 1 and 2 represents a state of a support member 20 before receiving the external force F in the vertical direction (see FIG. 1).

(Support Member)

The shock absorbing member 10 includes the support member 20 for supporting a foot of the wearer. The support member 20 is configured to be elastically deformable outward when receiving the external force F (see FIG. 1) in the vertical direction. Suitable examples of materials of the support member 20 include resin materials such as polyether block amide (PEBA), polyamide (PA), or thermoplastic polyurethane (TPU). Note that material characteristics of the support member 20 will be described later in detail.

The support member 20 includes: a bottom plate 21 shaped into a substantially flat plate and provided toward the ground (below the sole 1); and a top plate 22 shaped into a substantially flat plate and provided above the bottom plate 21. The top plate 22 is spaced apart from the bottom plate 21.

In a vertical clearance between the bottom plate 21 and the top plate 22, multiple walls 23, 23, . . . , each shaped into a substantial plate (three in the exemplary drawings) are provided. Each of the walls 23 is integrally formed with the bottom plate 21 and the top plate 22. In a side view, the walls 23 are curved so that a substantial center of each of the walls 23 in the vertical direction protrudes outward.

The support member 20 includes multiple cylindrical tubes 25, 25, . . . (three in the exemplary drawings). Each of the tubes 25 is provided to the substantial center of a corresponding one of the walls 23 in the vertical direction. Each tube 25 curbs and extends along the circumference of the outer periphery portion 11. The tube 25 is integrally formed with a corresponding one of the walls 23 at the substantial center of the wall 23 in the vertical direction. Inside the tube 25, a through hole 25a whose cross section is substantially circular is formed along the circumference of the outer periphery portion 11.

In view of a molding condition in molding of the production method and material characteristics of the support member to be described later, the constituent elements of the support member 20 (i.e., the bottom plate 21, the top plate 22, the walls 23, and the tubes 25) are preferably formed to have a thickness of 1.0 mm or greater. When the constituent elements have a thickness of 1.0 mm or greater, the thickness can reduce such risks as defective moldings. Note that, in order to improve various characteristics (e.g., durability and design of the shock absorbing member 10) of the shock absorbing member 10, the thickness of the constituent elements may partially be 0.5 mm or greater and less than 1.0 mm.

(Connection Member)

Next, the shock absorbing member 10 includes a connection member 40. The connection member 40 is formed by, for example, injection molding. Examples of materials of the connection member 40 include resin materials such as PEBA and TPU, and rubber materials such as synthetic rubber.

The connection member 40 is configured to be elastically deformable by the external force F in response to the elastic deformation of the support member 20. Specifically, an elastic range of the material of the connection member 40 may preferably be larger than an elastic range of the material of the support member 20. Note that material characteristics of the connection member 40 will be described later in detail.

The connection member 40 may be shaped into a bar whose cross section is circular and has a diameter of 1.0 mm or larger. When the connection member 40 has a diameter of 1.0 mm or larger, the diameter can avoid such risks as defective moldings in the molding of the production method to be described later.

The connection member 40 is laid across the tubes 25, 25 and connects the tubes 25, 25 together. Specifically, the connection member 40 extends between the neighboring tubes 25, 25 along the circumference of the outer periphery portion 11.

The connection member 40 is integrally formed with the tubes 25, while passing through the through holes 25a of the tubes 25. The connection member 40 is formed to be substantially circular or annular when observed in plan view. Specifically, while inserted through the tubes 25, 25, . . . , the connection member 40 is formed in a closed loop with the ends of the connection member 40 having no seams. Note that the connection member 40 does not have to be additionally glued to the tubes 25 with an adhesive.

(Advantages of Shock Absorbing Member)

When the external force F in the vertical direction is applied to the shock absorbing member 10 as illustrated in FIG. 1, the top plate 22 of the support member 20 is pressed down toward the bottom plate 21, and the substantial center of each of the outer walls 23 in the vertical direction bends outward of the outer periphery 11. Specifically, the support member 20 elastically deforms as the walls 23 bend outward of the outer periphery 11 by the external force F in the vertical direction. In this state, the walls 23 bend, and the tubes 25 move outward of the outer periphery portion 11.

When the support member 20 elastically deforms, receiving the external force F, the connection member 40 is pulled between the tubes 25, 25 along the circumference of the outer periphery portion 11. Specifically, the tubes 25, 25 move radially outward of the outer periphery portion 11, and the connection member 40 moves radially outward of the outer periphery portion 11 in response to the deformation of the support member 20. Hence, the connection member 40 elastically deforms such that an intermediate portion of the connection member 40 stretches between the tubes 25, 25 along the circumference of the outer periphery portion 11.

Thus, in the shock absorbing member 10, (i) the tubes 25, 25, . . . , move radially outward of the outer periphery portion 11 in response to the elastic deformation, by the external force F in the vertical direction, of the walls 23, 23, . . . , for the support member 20, and (ii) the connection member 40 inserted through the tubes 25, 25, . . . , moves in the same direction as the tubes 25, 25, . . . , move. While inserted through the through holes 25a of the tubes 25, the connection member 40 is integrally formed in a closed loop with the ends of the connection member 40 having no seams. Thus, even if the walls 23 of the support member 20 elastically deform by the external force F in the vertical direction, the connection member 40 does not easily come off the tubes 25, 25. Specifically, even if the walls 23 of the support member 20 elastically deform by the external force F, the connection member 40 can be stably held by the support member 20 regardless of the degree of the deformation. Therefore, the shock absorbing member 10 can maintain shock absorbing properties and repulsive force regardless of the degree of the external force F.

Moreover, because the shock absorbing member 10 is provided to a position in the sole 1 corresponding to a heel portion of the wearer's foot, the shoe S can achieve the above advantages in a position corresponding to the heel portion of the wearer's foot.

(Material Characteristics of Support Member and Connection Member)

Materials to be used for the support member 20 may preferably resist pressure and temperature in (2) the molding of the connection member 40 in the production method to be described later. For example, when a relatively rigid resin material in a solid state such as polyamide (PA) is used as a material of the support member 20, the support member 20 is less likely to deform even under high temperature and high pressure in the molding. Hence, the shock absorbing member 10 may be obtained easily in a stable manner. In contrast, when a relatively soft material such as urethane foam is used as a material of the support member 20, the support member 20 is likely to deform under the high temperature and high pressure. Hence, it would be difficult to obtain the shock absorbing member 10 in a stable manner.

Moreover, the support member 20 (tubes 25, 25, . . . ) may preferably be made of a material having a melting point higher than a molding temperature of the thermoplastic resin material included in the connection member 40. In contrast, if the molding temperature of the thermoplastic resin material included in the connection member 40 rises above the melting point of the material of the support member 20, there will be the risk that the support member 20 might melt in (2) the molding to be described later. Hence, it would be difficult to obtain the shock absorbing member 10 in a stable manner.

Moreover, in order to obtain the advantages of the shock absorbing member 10, the support member 20 and the connection member 40 may preferably be made of a material having a predetermined Young's module. Specifically, a preferable material for the support member 20 has a Young's module ranging from 20 MPa to 3000 MPa. An example of the material includes TPU having a hardness of 90A or PA containing glass. Furthermore, a preferable material for the connection member 40 has a Young's module ranging from 0.5 MPa to 300 MPa. An example of such a suitable material includes soft foam such as EVA or PEBA having a hardness of 60D. Then, the support member 20 (tubes 25, 25, . . . ) may be made of a material higher in rigidity than the thermoplastic resin material included in the connection member 40.

Table 1 describes combination examples (1) to (4) of the materials suitable to the material characteristics and molding conditions of the support member 20 and the connection member 40. Note that, for the support member 20 and the connection member 40, the combination examples of the materials are not limited to the examples in Table 1. Alternatively, the combinations may be made of materials having similar characteristics as those in Table 1.

TABLE 1

|  | Support Member | | | Connection Member | | |
| --- | --- | --- | --- | --- | --- | --- |
|  | Name of Material | Young's Module | Molding Temperature | Name of Material | Young's Module | Molding Temperature |
| Combination Example (1) | Rilsan BZM 70TL (Arkema S.A./PA + Glassfiber) | 1800 Mpa | 270 C.° | PEBAX 4533 SP 01 (Arkema S.A./PEBA) | 90 MPa | 240 C.° |
| Combination Example (2) | PEBAX Rnew 80R53 SP 02 (Arkema S.A./PEBA) | 850 MPa | 260 C.° | PEBAX Rnew 40R53 SP 01 (Arkema S.A./PEBA) | 75 MPa | 240 C.° |
| Combination Example (3) | Vestamid E55-S4 (Daicel Evonik Ltd/PEBA) | 220 MPa | 260 C.° | Vestamid E40-S1 (Daicel Evonik Ltd/PEBA) | 80 MPa | 240 C.° |
| Combination Example (4) | Estane 2103-90A (Lubrizol Co../TPU) | 25 MPa | 210 C.° | EVA Form | 1 MPa | 175 C.° |

(Mold Apparatus)

Figure 3:
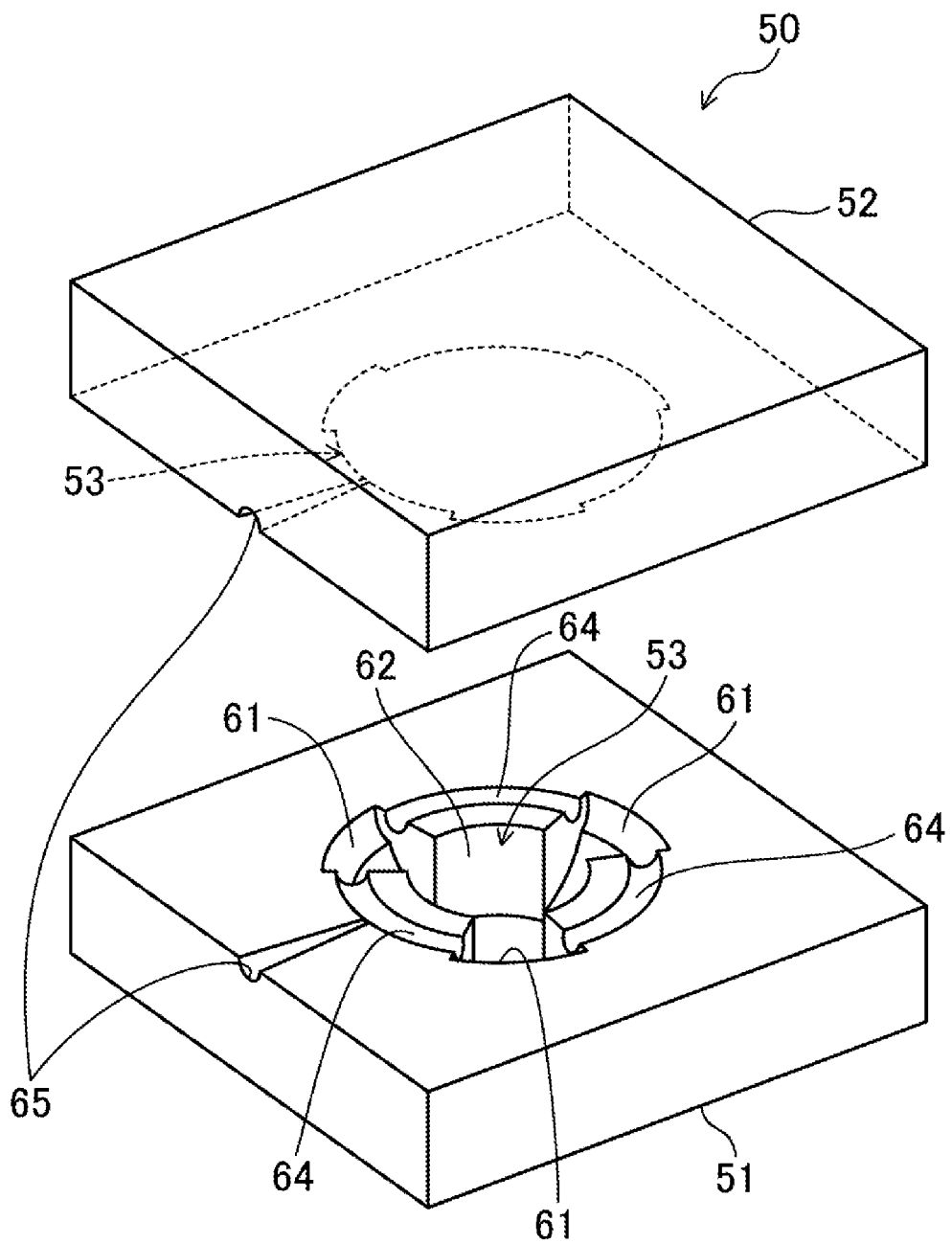
FIG. 3 is a perspective view illustrating a mold apparatus, of the first embodiment, which is vertically separated.
Figure 4:
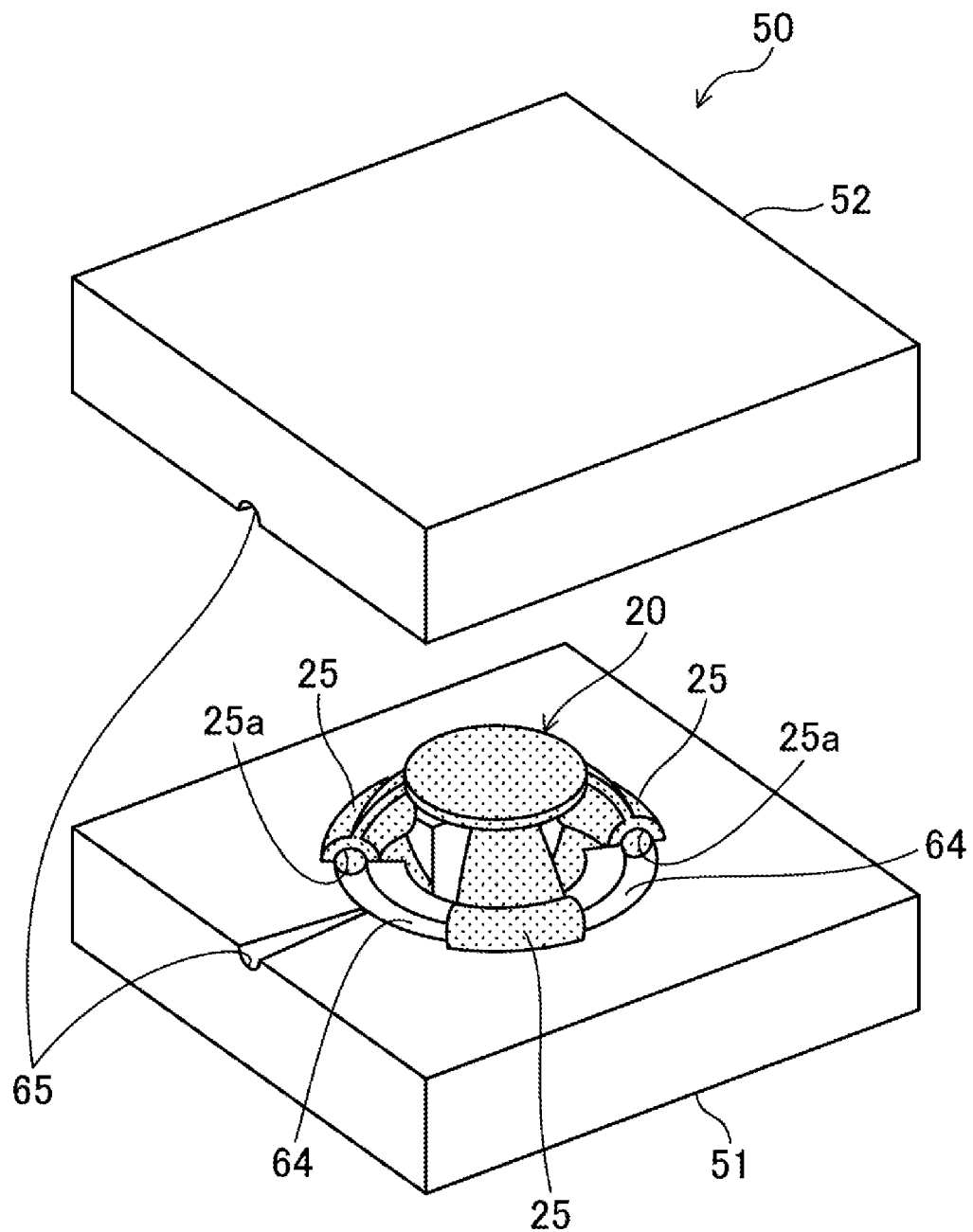
FIG. 4 is a perspective view illustrating a state of a support member housed in a first housing of the mold apparatus in inserting.

The shock absorbing member 10 is produced by injection molding with a mold apparatus 50 illustrated in, for example, FIG. 3. An example of the mold apparatus 50 is shaped into a substantially rectangular shape, and includes cavity molds; namely, a lower mold 51 and an upper mold 52. As to the mold apparatus 50, for example, the upper mold 52 vertically moves with respect to the lower mold 51.

The lower mold 51 has a top face provided with a recessed cavity 53 shaped into a substantially circular shape in plan view. Moreover, the upper mold 52 has a bottom face also provided with another cavity 53 a size and a shape of which are the same as those of the cavity 53 in the lower mold 51 (see FIG. 3). The lower mold 51 and the upper mold 52 are placed on top of each other so that the cavities 53 vertically face each other. First housings 61, 61, . . . , a second housing 62, and molding spaces 64, 64, . . . , serve as portions of the cavities 53 when the lower mold 51 and the upper mold 52 are placed on top of each other.

The mold apparatus 50 includes the multiple first housings 61, 61, . . . (three in FIG. 3) capable of housing the tubes 25 of the shock absorbing member 10. Each of the first housings 61 is shaped into a substantially cylindrical hollow shape with the lower mold 51 and the upper mold 52 placed on top of each other. The first housings 61 are curved so that each of the first housings 61 fits an outline of a corresponding one of the tubes 25. The first housings 61, 61, . . . , are equally spaced from one another along the circumference of the cavities 53.

The mold apparatus 50 includes the second housing 62 for housing the support member 20 of the shock absorbing member 10. The second housing 62 is shaped to house the support member 20.

The mold apparatus 50 includes the multiple molding spaces 64, 64, . . . , for molding the connection member 40 of the shock absorbing member 10. The molding spaces 64, 64, . . . , are equally spaced from one another along the circumference of the cavities 53. Specifically, each of the molding spaces 64 is provided between the first housings 61, 61.

Each of the molding spaces 64 is shaped into a substantially cylindrical hollow shape with the lower mold 51 and the upper mold 52 placed on top of each other. The molding spaces 64 are curved so that each of the molding space 64 fits an outline of the connection member 40. Moreover, the molding spaces 64 extend to communicate with the through holes 25a of the tubes 25 with the first housings 61 housing the tubes 25. Inside the cavities 53, a path is formed in a shape of a closed loop with the molding spaces 64 and the through holes 25a of the tubes 25 communicating with one another.

The mold apparatus 50 includes a gate 65 communicating with the molding spaces 64. With the lower mold 51 and the upper mold 52 placed on top of each other, the gate 65 is shaped into a substantially circular conic shape to taper from a side face of the mold apparatus 50 toward an interior of each of the cavities 53, 53.

(Method for Producing Shock Absorbing Member)

Described next is a method for producing the shock absorbing member 10 with reference to FIGS. 3 to 7. This method mainly includes (1) the inserting and (2) the molding. Note that, in FIGS. 4 to 6, the support member 20 and the connection member 40 are hatched with dots so that the support member 20 and the mold device 50 are distinguished from the elements of the mold apparatus 50.

(1) Inserting

In the inserting, each of the tubes 25 is housed in a corresponding one of the first housings 61 and the support member 20 is housed in the second housing 62, such that the molding spaces 64 and the through holes 25a of the tubes 25 communicate with one another. Specifically, the upper mold 52 is raised while the lower mold 51 is secured on, for example, a not-shown installation table. Hence, the mold apparatus is vertically separated (see FIG. 3). Next, the tubes 25 and the support member 20 are housed in the first housings 61 and the second housing 62 of the lower mold 51 (see FIG. 4). After this housing operation, the upper mold 52 is placed on top of the lower mold 51 (see FIG. 5). Hence, the molding spaces 64 and through holes 25a of the tubes 25 communicate with one another.

(2) Molding

Figure 5:
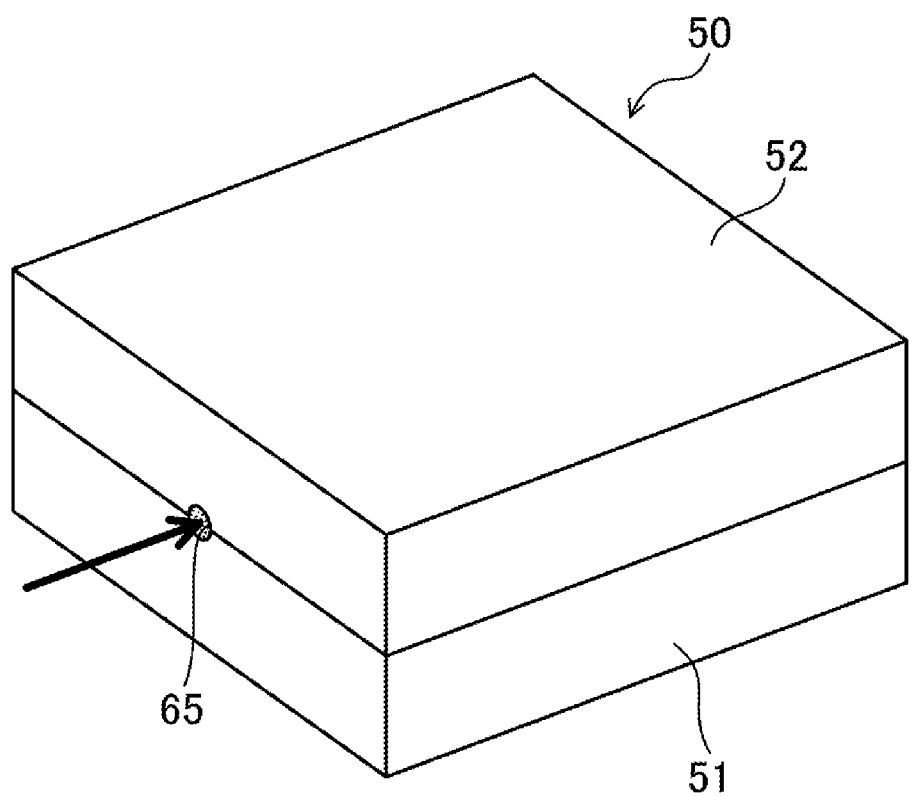
FIG. 5 is a perspective view illustrating a state of a thermoplastic resin material injected from a gate of the mold apparatus.
Figure 6:
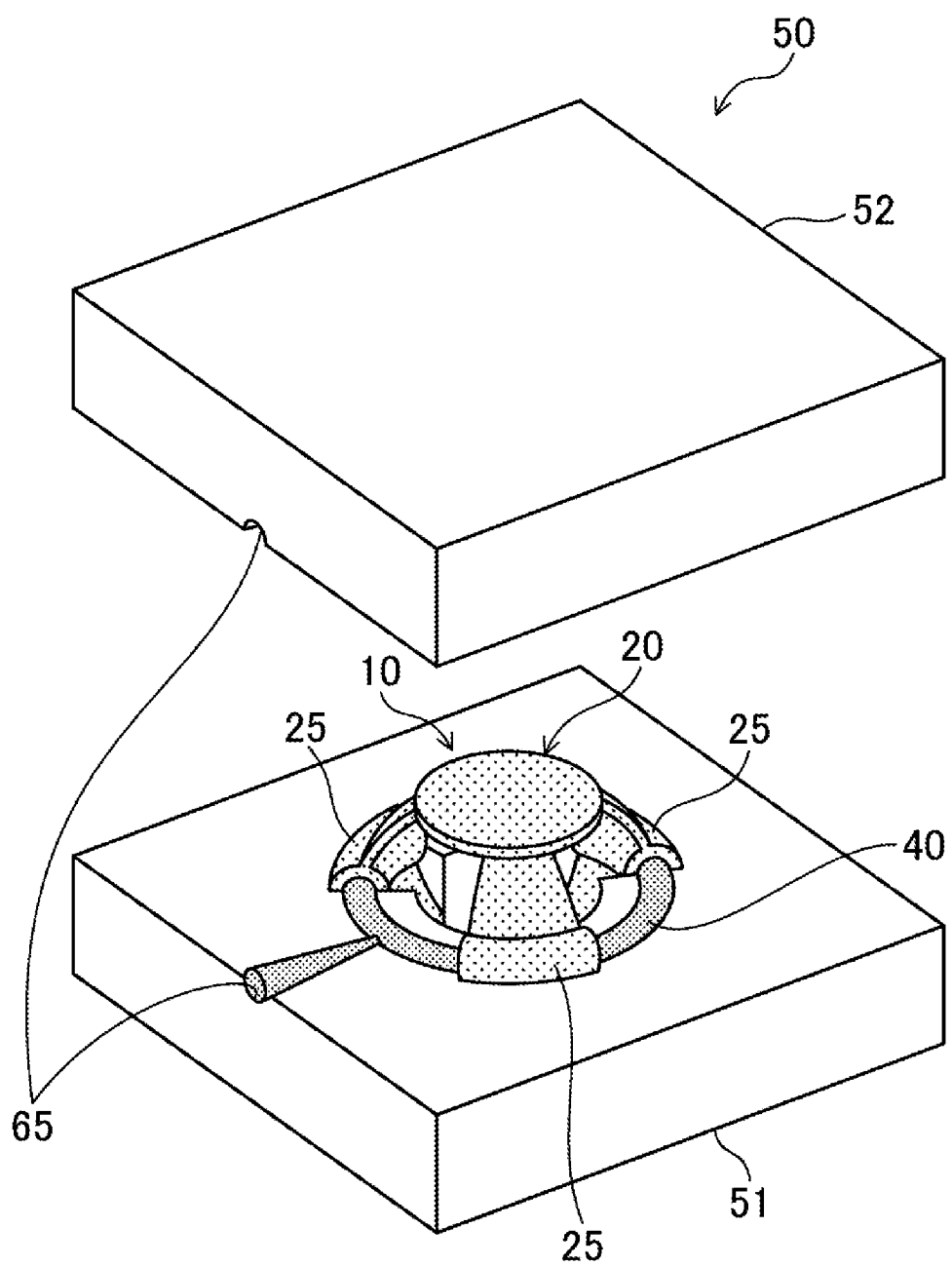
FIG. 6 is a perspective view illustrating a state of tubes and a connection member integrally formed in molding.
Figure 7:
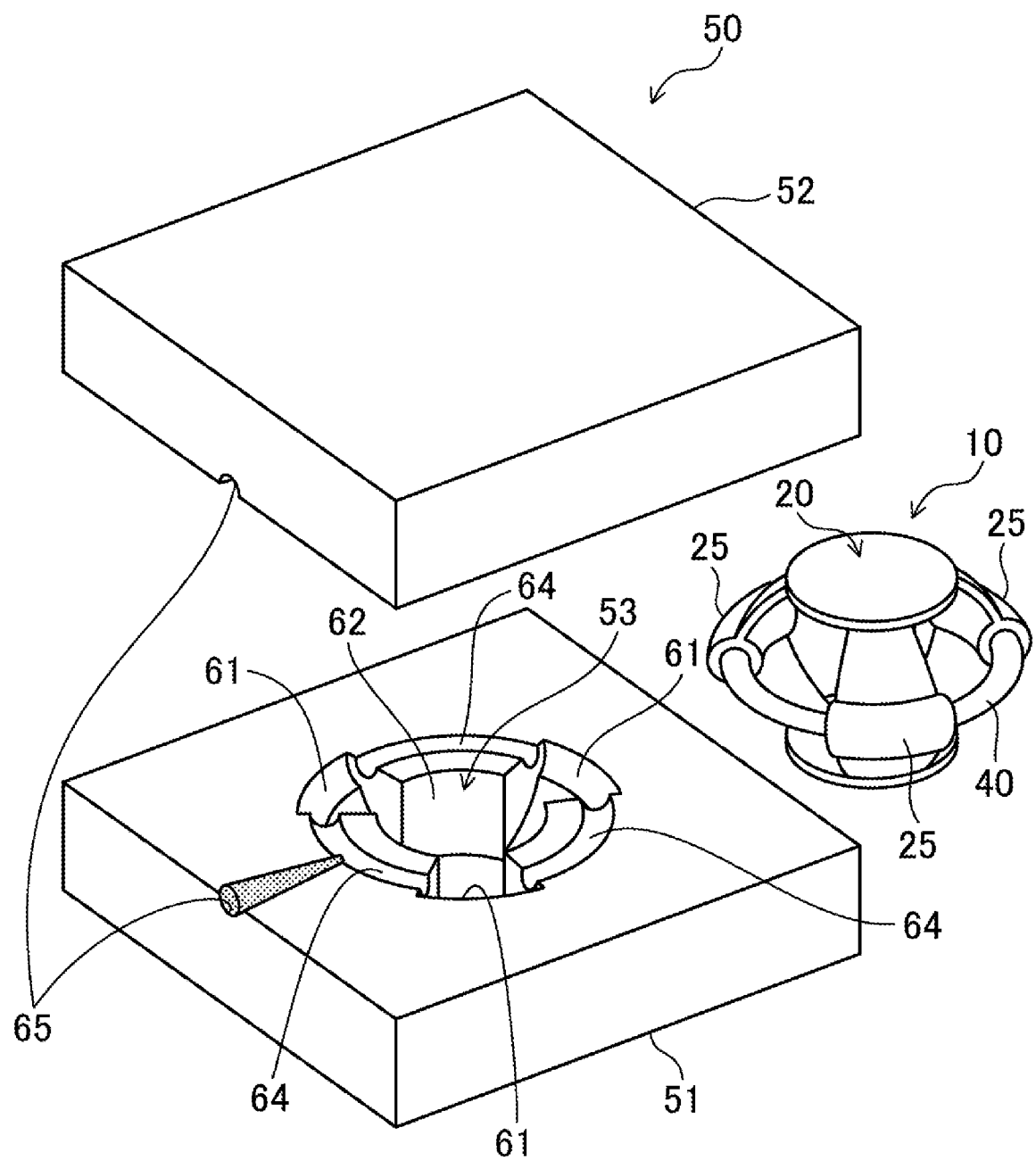
FIG. 7 is a perspective view illustrating a state of the shock absorbing member of the first embodiment taken out of the mold apparatus.

Next, in the molding, a thermoplastic resin material to form the connection member 40 is injected (fed) into the mold apparatus 50 so that the tubes 25, 25, . . . , and the connection member 40 are integrally formed. Specifically, the thermoplastic resin material is heated to melt by a not-shown injection molder. Then, the thermoplastic resin material is injected from the gate 65 of the mold apparatus 50 toward the molding spaces 64 and the tubes 25 (see FIG. 5). In this state, a temperature for molding the thermoplastic resin material is appropriately set so that the temperature is suitable to the materials to form the connection member 40 (see Table 1). After the thermoplastic resin material is filled inside the molding spaces 64 and the through holes 25a of the tubes 25, 25, . . . , the mold apparatus 50 receives a predetermined cooling treatment. Hence, the tubes 25, 25, . . . , and the connection member 40 are integrally formed. In particular, in the molding of this embodiment, the tubes 25, 25, . . . , and the connection member 40 are integrally formed while the connection member 40 is formed in a closed loop and the ends of the connection member 40 have no seams, with the connection member 40 inserted into the through holes 25a of the tubes 25, 25, . . . . After the end of the cooling treatment, the upper mold 52 is raised and the shock absorbing member 10 is taken out (FIGS. 6 and 7).

Through (1) the inserting and (2) the molding, the shock absorbing member 10 can be obtained.

[Advantages of First Embodiment]

As can be seen, the method for producing the shock absorbing member 10 includes: the inserting which involves housing each of the tubes 25, 25, . . . , in a corresponding one of the first housings 61 so that the molding spaces 64 and the tubes 25 communicate with one another; and the molding which involves heating to melt the thermoplastic resin material to form the connection member 40 and injecting the thermoplastic resin material from the gate 65 toward the molding spaces 64 and the tubes 25 so that the tubes 25, 25, . . . , and the connection member 40 are integrally formed. In this production method, the inserting facilitates communication between the molding spaces 64 and the tubes 25 in the mold apparatus 50. As a result, in the molding, the tubes 25, 25, . . . , and the connection member 40 can be integrally formed accurately while the positional relationship between the tubes 25, 25, . . . , and the connection member 40 can be stably maintained in the mold apparatus 50. Moreover, in the molding, the tubes 25, 25, . . . , and the connection member 40 are integrally formed, eliminating the need of separately assembling the tubes 25, 25, . . . , and the connection member 40. In addition, the integral forming easily achieves a structure in which the connection member 40 is kept from coming off the insides of the tubes 25, 25, . . . , even if the connection member 40 is not glued to the tubes 25, 25, . . . . Hence, the method for producing the shock absorbing member 10 according to the first embodiment of the present disclosure makes it possible to easily obtain a robust shock absorbing member 10 in a stable manner.

In the inserting, each of the tubes 25 is housed in a corresponding one of the first housings 61 and the support member 20 is housed in the second housing 62, such that the molding spaces 64 and the tubes 25 communicate with one another. Such features make it possible to easily obtain, in a stable manner, the shock absorbing member 10 including the support member 20.

Moreover, the tubes 25, 25, . . . , and the connection member 40 are integrally formed while the connection member 40 is formed in a closed loop and the ends of the connection member 40 have no seams, with the connection member 40 inserted into the tubes 25. Specifically, the connection member 40 obtained in the molding of this embodiment is formed in a closed loop while communicating with the tubes 25. Thus, even if the connection member 40 elastically deforms by the external force F in the vertical direction, the above features make it possible to easily obtain, in a stable manner, the robust shock absorbing member 10 in which the connection member 40 is hard to come off the insides of the tubes 25, 25, . . . .

Moreover, the support member 20 and the tubes 25, 25, . . . , are made of a material having a melting point higher than a molding temperature of the thermoplastic resin material that forms the connection member 40. Such a feature reduces the risk that the support member 20 and the tubes 25, 25, . . . , melt, so that the shock absorbing member 10 can be easily obtained in a stable manner.

Moreover, the support member 20 and the tubes 25, 25, . . . , are made of a material higher in rigidity than the thermoplastic resin material that forms the connection member 40. Such a feature makes it possible to easily obtain, in a stable manner, the shock absorbing member 10 having shock absorbing properties and repulsive force.

[Second Embodiment]

FIGS. 8 to 13 illustrate the shock absorbing member 10 and the mold apparatus 50 for producing the shock absorbing member 10 according to a second embodiment of the present disclosure. The shock absorbing member 10 and the mold apparatus 50 in the second embodiment are partially different from those in the first embodiment. Note that other configurations of the shock absorbing member 10 and the mold apparatus 50 according to this embodiment are the same as those of the shock absorbing member 10 and the mold apparatus 50 according to the first embodiment. Therefore, elements that are the same as those shown in FIGS. 1 to 7 are denoted by the corresponding reference characters, and detailed descriptions thereof are omitted herein.

Figure 8:
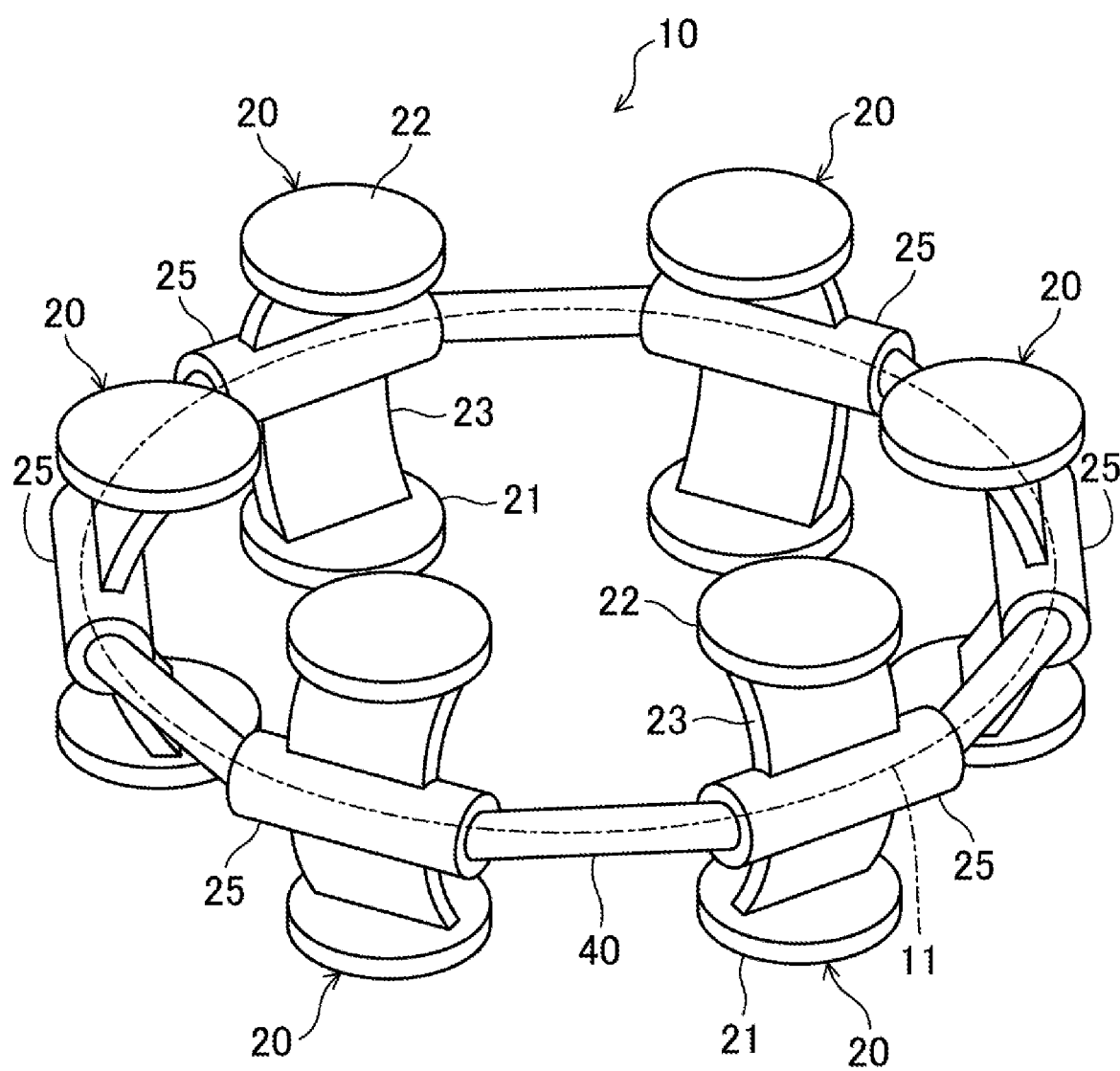
FIG. 8 is a perspective view corresponding to FIG. 2, and illustrating a shock absorbing member of a second embodiment, as viewed from above.

As illustrated in FIG. 8, the shock absorbing member 10 has an outer periphery portion formed to be annular in polygon when observed in plan view. The shock absorbing member 10 includes multiple support members 20, 20, . . . (six in the exemplary drawings). The support members 20, 20, . . . , are spaced apart from each other along the circumference of the outer periphery portion 11.

In each of the support members 20, one wall 23 is provided in a vertical clearance between the bottom plate 21 and the top plate 22. The wall 23 is integrally formed with the bottom plate 21 and the top plate 22. In a side view, each wall 23 is curved so that a substantial center of the wall 23 in the vertical direction protrudes outward.

Each of the support members 20 includes one tube 25. Each tube 25 is provided to the substantial center of a corresponding one of the walls 23 in the vertical direction. Each tube 25 extends straight along the circumference of the outer periphery portion 11. The tube 25 is integrally formed with a corresponding one of the walls 23 at the substantial center of the wall 23 in the vertical direction.

The connection member 40 is laid across the support members 20, 20 and connects the support members 20, 20 together. Specifically, between the neighboring support members 20, 20 the connection member 40 is polygonally shaped along the circumference of the outer periphery portion 11. While inserted through the through holes 25a of the tubes 25 of the support members 20, the connection member 40 is integrally formed in a closed loop with the ends of the connection member 40 having no seams.

Figure 9:
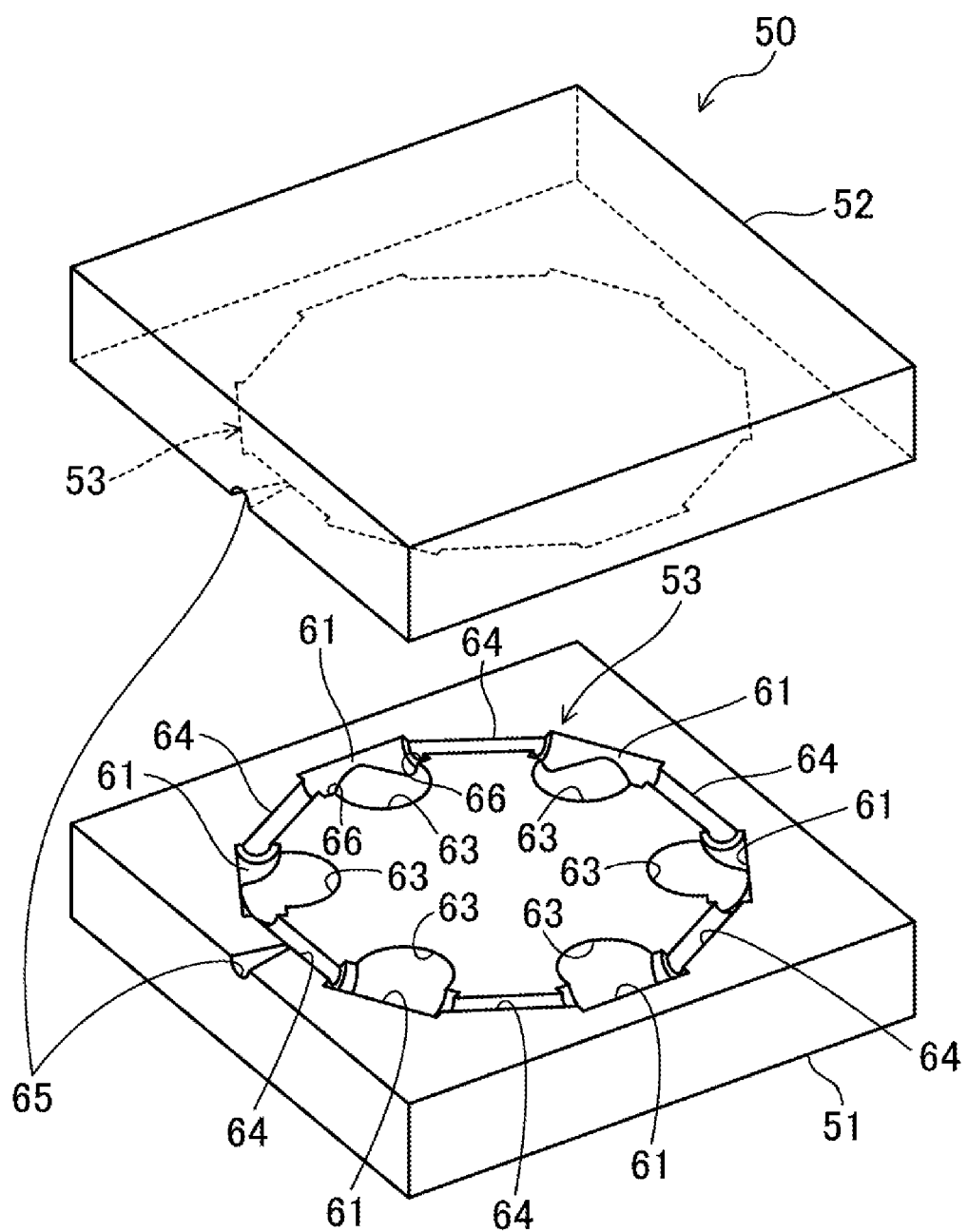
FIG. 9 corresponds to FIG. 3, and illustrates a state of a mold apparatus, of the second embodiment, which is vertically separated.
Figure 10:
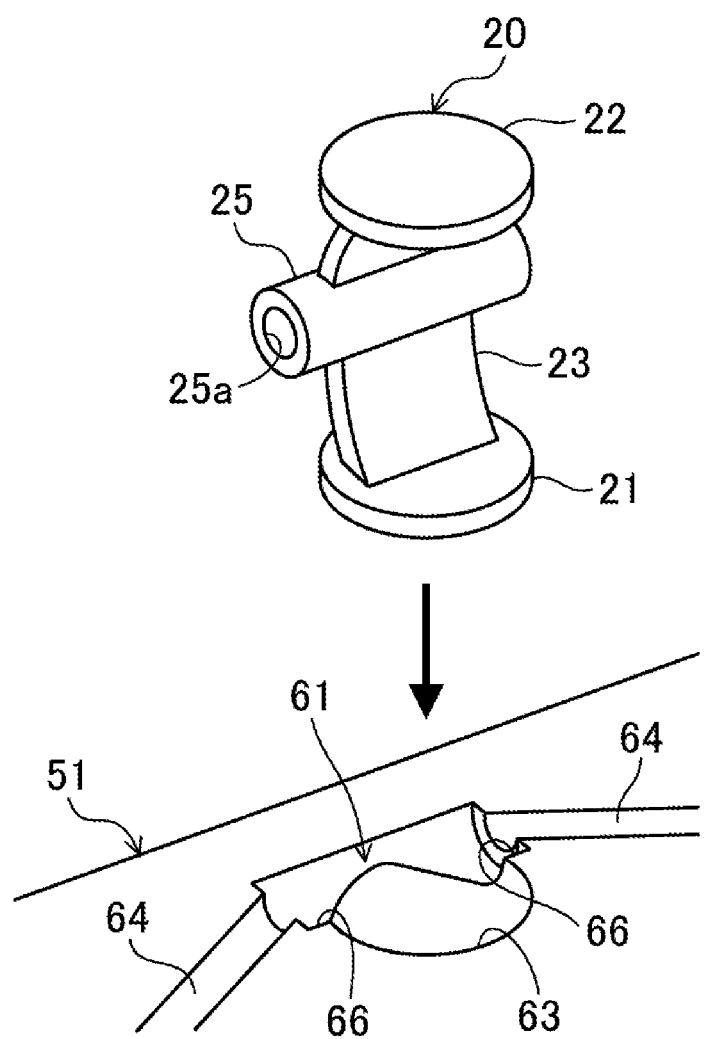
FIG. 10 is a partially enlarged perspective view illustrating a state of a support member before housed in a third housing of the mold apparatus in inserting of the second embodiment.
Figure 13:
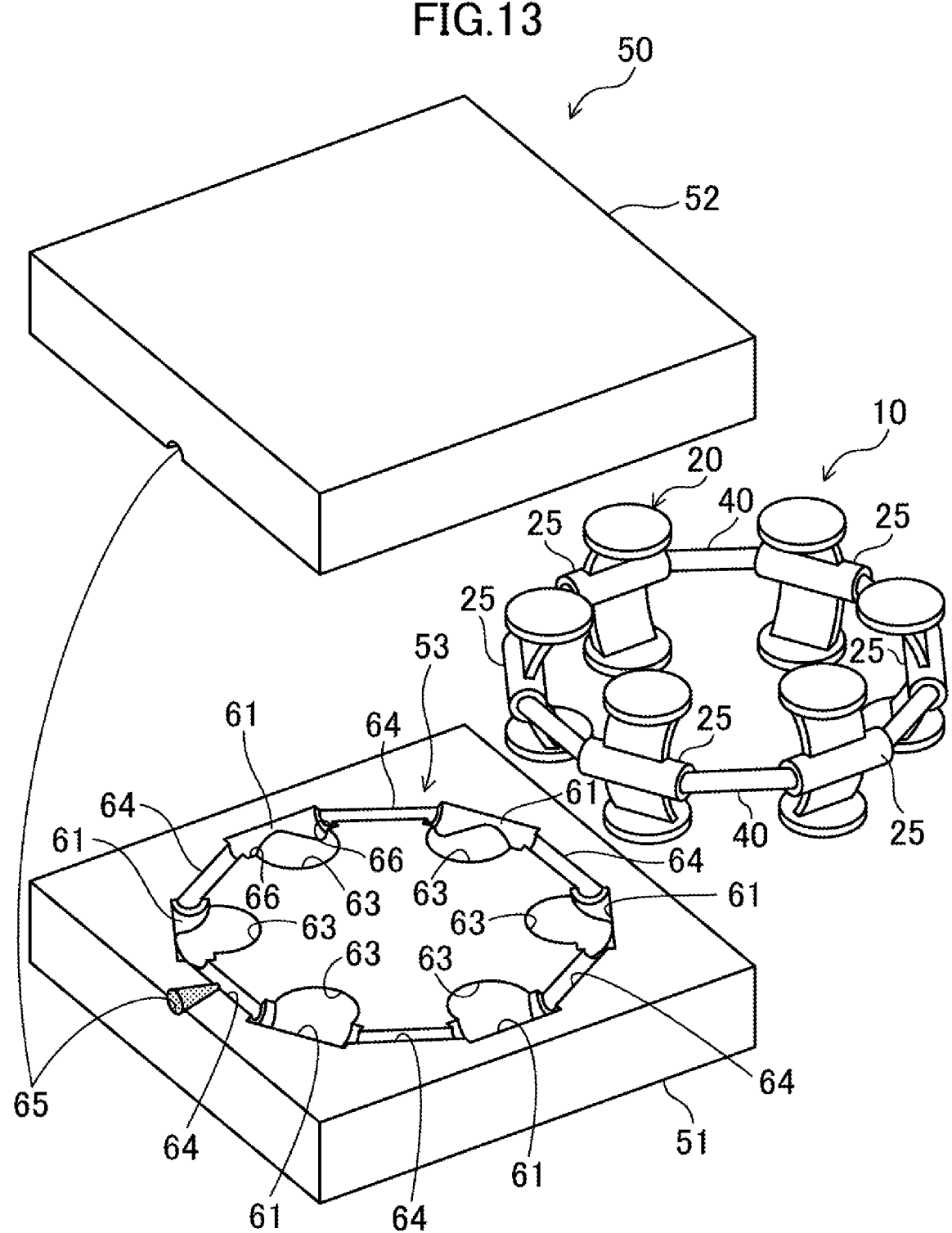
FIG. 13 corresponds to FIG. 7 and illustrates a state of a shock absorbing member of the second embodiment taken out of the mold apparatus.

Next, as illustrated in FIG. 9, each of the first housings 61 of the mold apparatus 51 is shaped into a substantially cylindrical hollow shape with the lower mold 51 and the upper mold 52 placed on top of each other. The first housings 61 are shaped straight so that each of the first housings 61 fits an outline of a corresponding one of the tubes 25. The first housings 61, 61, . . . , are equally spaced from one another along the circumference of the cavities 53. Moreover, also as illustrated in FIG. 13, each of the first housings 61 is provided with holding components 66, 66 capable of holding both ends of a corresponding one of the tubes 25.

The mold apparatus 50 includes multiple third housings 63, 63, . . . (six in exemplary drawings) capable of housing the support members 20 of the shock absorbing member 10. The third housings 63, 63, . . . , are arranged in the cavities 53, 53 of the mold apparatus 50. The third housings 63, 63, . . . , are spaced from one another along the circumference of the cavities 53, with each of the molding spaces 64 provided between the third housings 63. The third housings 63 are shaped to house the support members 20. Note that, the mold apparatus 50 of this embodiment is not provided with the second housing 62 described in the first embodiment.

Each of the molding spaces 64 is shaped into a substantially cylindrical hollow shape with the lower mold 51 and the upper mold 52 placed on top of each other. The molding spaces 64 are shaped straight to fit an outline of the connection member 40. Moreover, the molding spaces 64 extend to communicate with the through holes 25a of the tubes 25 with the first housings 61 housing the tubes 25. The molding spaces 64 and the tubes 25 communicate with one another and form a closed loop.

Figure 11:
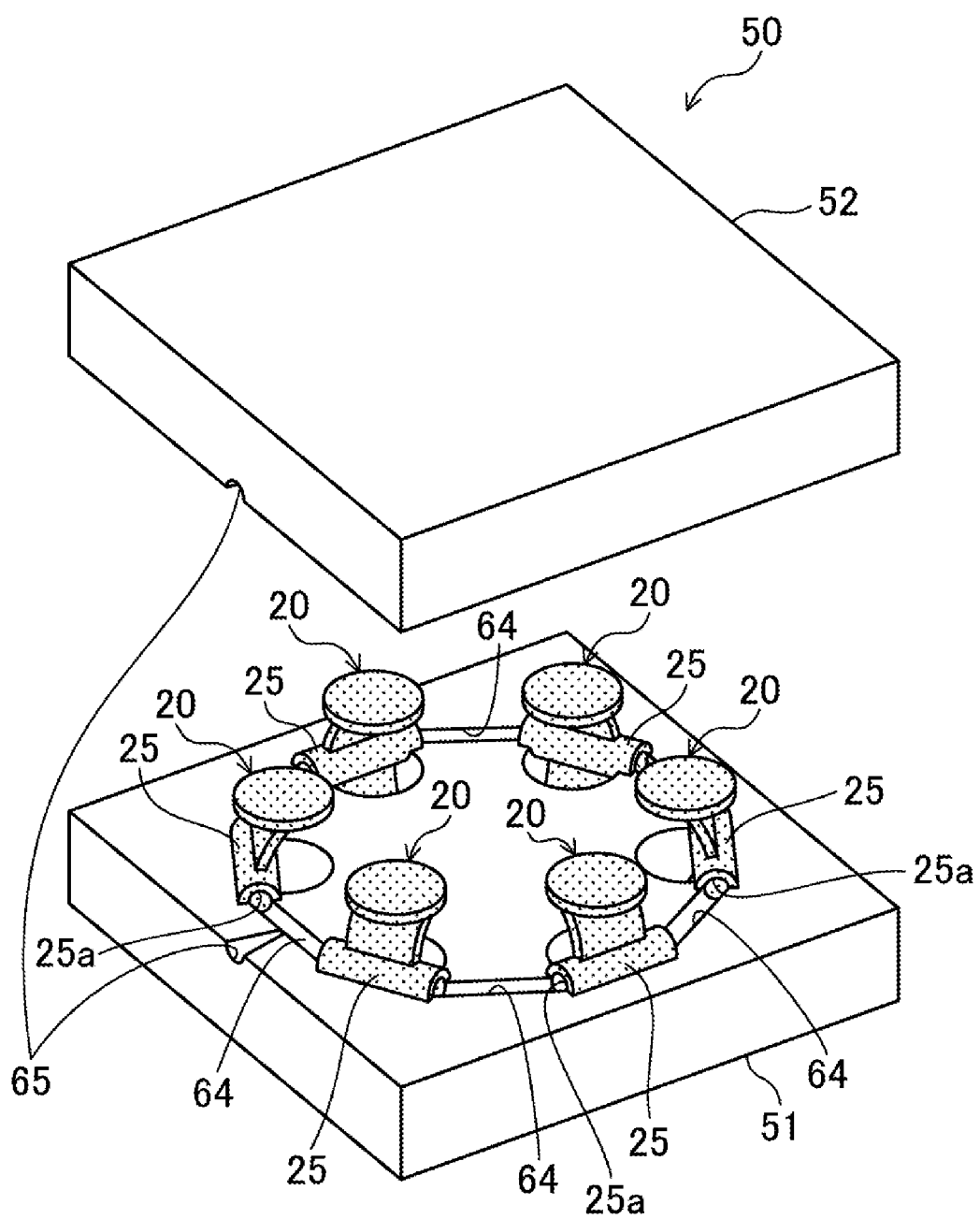
FIG. 11 corresponds to FIG. 4, and illustrates a state of the support member after housed in the third housing of the mold apparatus in the inserting of the second embodiment.
Figure 12:
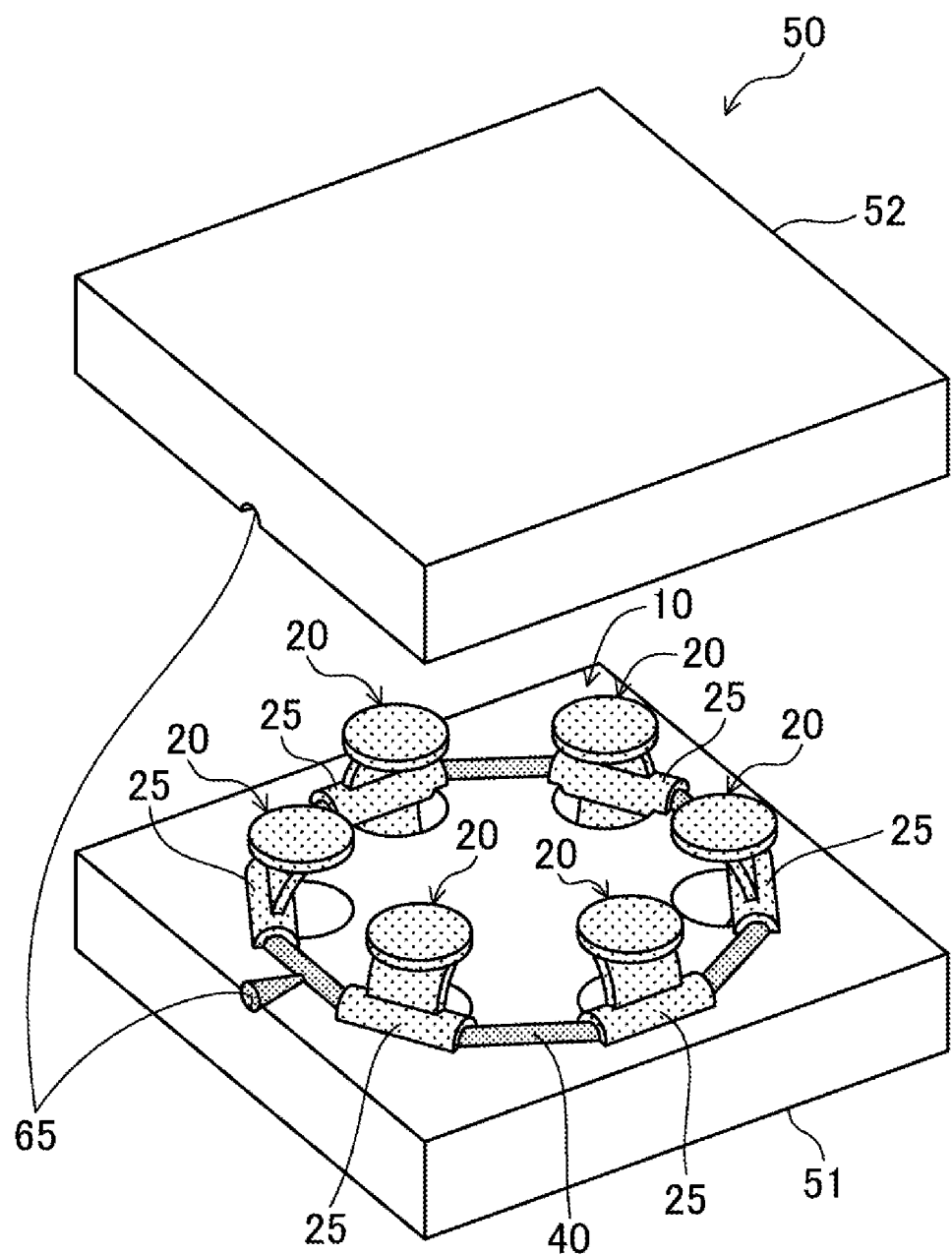
FIG. 12 corresponds to FIG. 6, and illustrates a state of tubes and a connection member integrally formed in molding of the second embodiment.

Described next is a method for producing the shock absorbing member 10 with reference to FIGS. 9 to 13. This method includes (1) the inserting and (2) the molding, as seen in the first embodiment. In FIGS. 11 and 12, the support members 20 and the connection member 40 are hatched with dots as seen in the first embodiment.

(1) Inserting

In the inserting, each of the tubes 25 is housed in a corresponding one of the first housings 61 and each of the support members 20 is housed in a corresponding one of the third housings 63, such that the molding spaces 64 and the tubes 25 communicate with one another. Specifically, the upper mold 52 is raised while the lower mold 51 is secured. Hence, the mold apparatus is vertically separated. (See FIG. 9). Next, each of the tubes 25 is housed in the corresponding first housing 61 in the lower mold 51, and each of the support members 20 is housed in the corresponding third housing 63 in the lower mold 51 (see FIG. 11). In particular, each tube 25 is positioned so that both ends of the tube 25 are appropriately held by the holding components 66, 66 and housed in the corresponding first housing 61 (See FIG. 10). After this housing operation, the upper mold 52 is placed on top of the lower mold 51 (see FIG. 5 illustrated in the first embodiment). Hence, the molding spaces 64 and the tubes 25 communicate with one another.

(2) Molding

Next, in the molding, as seen in the first embodiment, the thermoplastic resin material to form the connection member 40 is heated to melt by a not-shown injection molder. Then, the thermoplastic resin material is injected from the gate 65 of the mold apparatus 50 toward the molding spaces 64 and the tubes 25 (See FIG. 5). After the thermoplastic resin material is filled inside the molding spaces 64 and the tubes 25, 25, . . . , the mold apparatus 50 receives a predetermined cooling treatment. Hence, the tubes 25, 25, . . . , and the connection member 40 are integrally formed. In the molding of this embodiment, too, the tubes 25, 25, . . . , and the connection member 40 are integrally formed while the connection member 40 is formed in a closed loop and the ends of the connection member 40 have no seams with the connection member 40 inserted into the through holes 25a of the tubes 25, 25, . . . After the end of the cooling treatment, the upper mold 52 is raised and the shock absorbing member 10 is taken out (see FIGS. 12 and 13). This is how the shock absorbing member 10 is obtained.

As can be seen, in the inserting of the method for producing the shock absorbing member 10 according to this embodiment, each of the tubes 25 is housed in a corresponding one of the first housings 61 and each of the support members 20 is housed in a corresponding one of the third housings 63, such that the molding spaces 64 and the tubes 25 communicate with one another. Such features make it possible to easily obtain, in a stable manner, the shock absorbing member 10 including the multiple support members 20, 20, . . .

In the inserting, each of the tubes 25 is housed in a corresponding one of the first housings 61 while the both ends of each of the tubes 25 are held by the holding components 66, 66, such that the molding spaces 64 and the tubes 25 communicate with one another. Such a feature allows the both ends of each tube 25 to be stabilized in the mold apparatus 50 by the holding components 66, 66, making it possible to accurately communicating the molding spaces 64 with the tubes 25.

[Third Embodiment]

Figure 14:
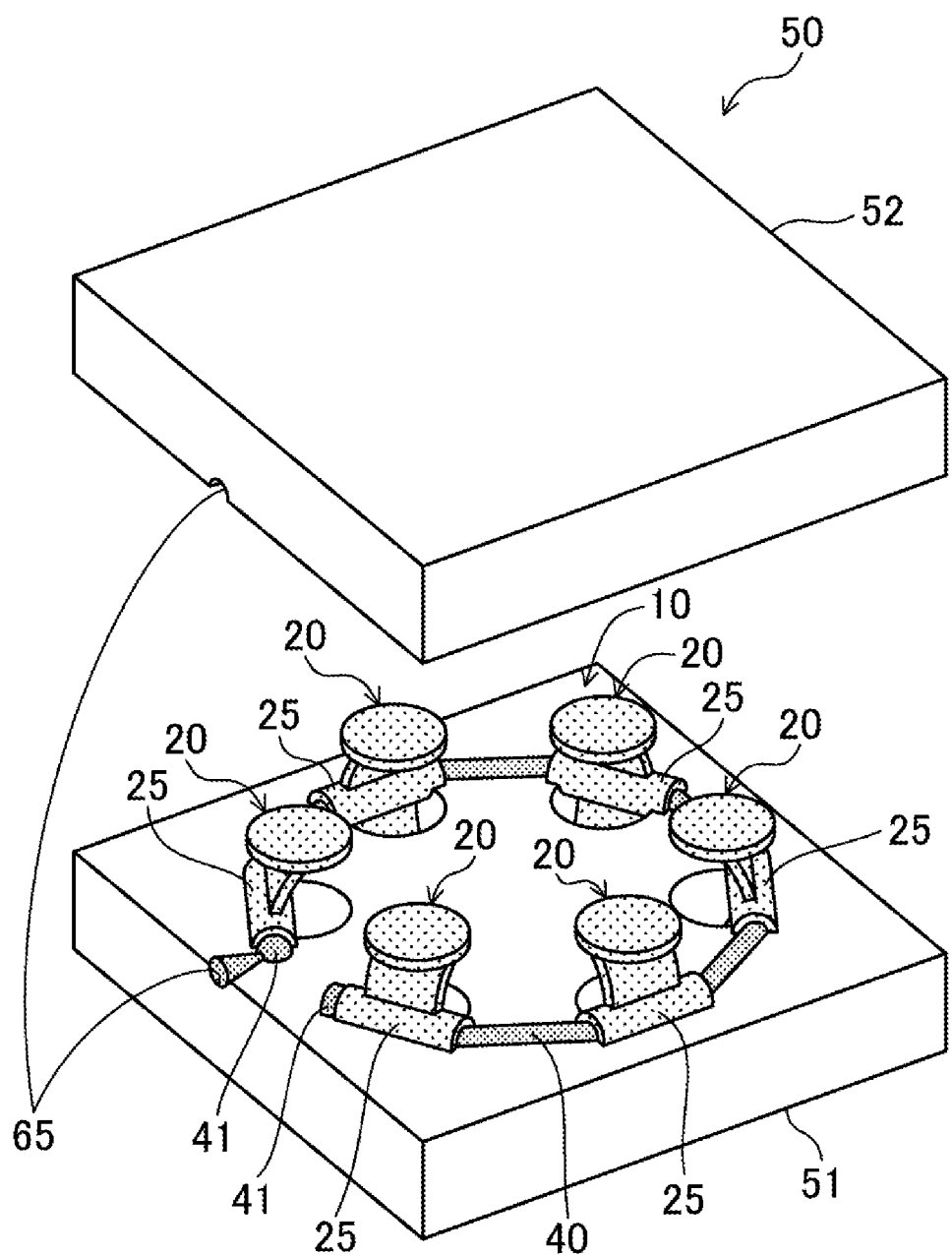
FIG. 14 corresponds to FIG. 12, and illustrates a state of tubes and a connection member integrally formed in molding of a third embodiment.
Figure 15:
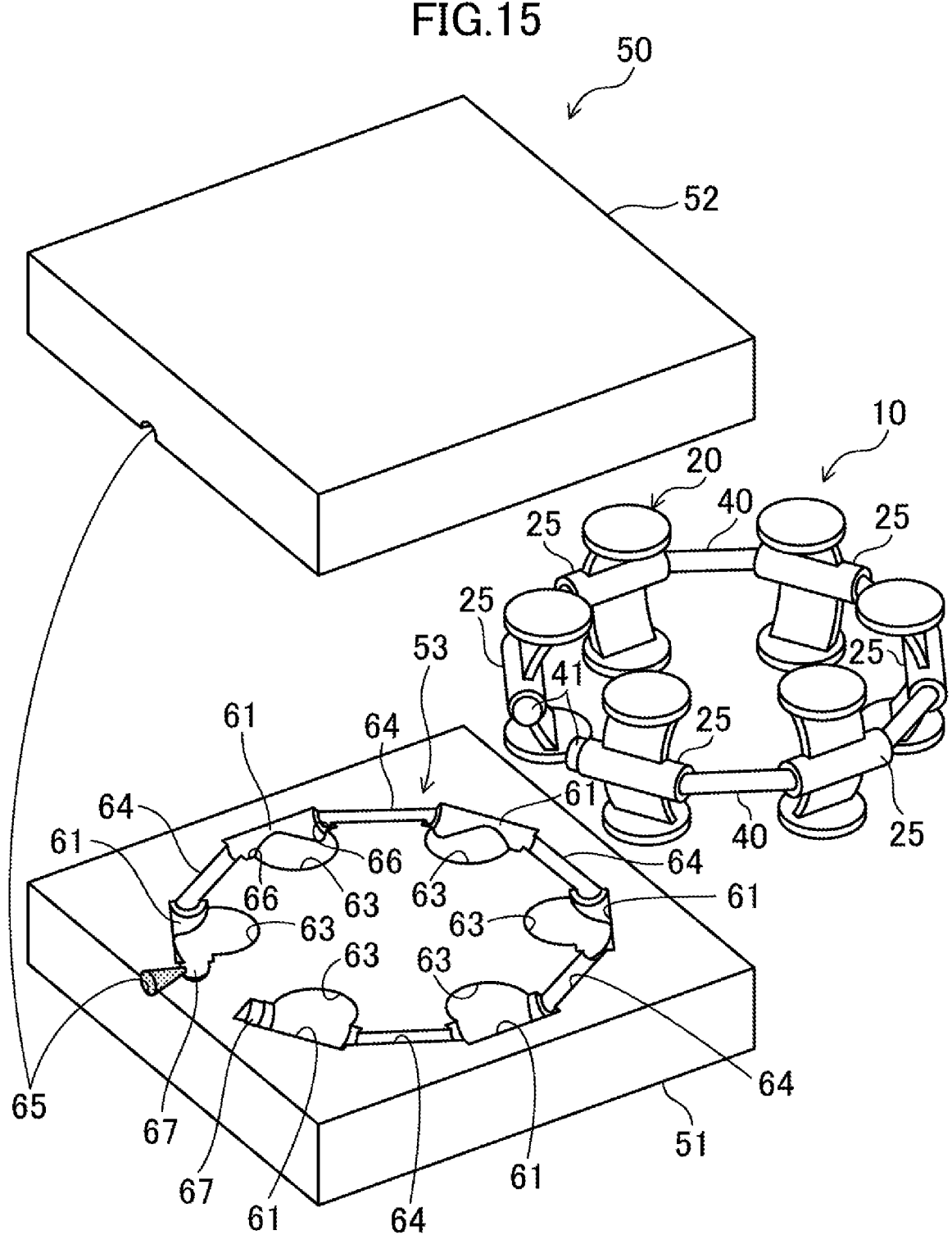
FIG. 15 corresponds to FIG. 13, and illustrates a state of a shock absorbing member of a third embodiment taken out of the mold apparatus.

FIGS. 14 and 15 illustrate the shock absorbing member 10 and the mold apparatus 50 for producing the shock absorbing member 10 according to a third embodiment of the present disclosure. The shock absorbing member 10 and the mold apparatus 50 in the third embodiment are partially different in configuration from those in the second embodiment. Note that other configurations of the shock absorbing member 10 and the mold apparatus 50 according to this embodiment are the same as those of the shock absorbing member 10 and the mold apparatus 50 of the second embodiment. Therefore, elements that are the same as those shown in FIGS. 8 to 13 are denoted by the corresponding reference characters, and detailed descriptions thereof are omitted herein.

The connection member 40 of the shock absorbing member 10 according to this embodiment is different in shape from the closed connection member 40 described in the second embodiment. Specifically, the connection member 40 according to the third embodiment is formed in a non-closed loop; that is, the connection member 40 described in the above second embodiment is partially open. As illustrated in FIGS. 14 and 15, the extending connection member 40 is open between the tubes 25, 25 each positioned at one of ends of the connection member 40

The ends of the connection member 40 are each provided with a retainer 41. Each of retainers 41 is provided outside of one of the tubes 25, 25 located at the ends of the connection member 40. Specifically, the retainers 41, 41 are spaced apart from, and face, each other along the circumference of the connection member 40. Each of the retainers 41 has an outer diameter larger than an inner diameter of the through hole 25a for each of the tubes 25.

As illustrated in FIGS. 14 and 15, the retainer 41 located in the left of FIGS. 14 and 15 is formed in a substantial sphere; whereas, the retainer 41 located in the right of FIGS. 14 and 15 is formed in a substantial disc. Note that the shapes of the retainers 41, 41 are not limited to such shapes. Alternatively, the retainers 41, 41 may be formed in various shapes.

As illustrated in FIG. 15, the mold apparatus 50 includes retainer molding spaces 67, 67. Each of the retainer molding spaces 67, 67 is provided outside of one of the first housings 61, 61 housing the tubes 25, 25 positioned at the ends of the shock absorbing member 10. The retainer molding space 67 located in the left of FIG. 15 is formed in a substantial sphere; whereas, the retainer molding space 67 located in the right of FIG. 15 is formed in a substantial disc. Note that, in this embodiment, the gate 65 communicates with the retainer molding space 67 on the right.

The, as illustrated in FIG. 14, in the molding of the method for producing the shock absorbing member 10, the thermoplastic resin material to form the connection member 40 is injected toward the retainer molding spaces 67, 67 to mold the retainers 41, 41 formed at both ends of the connection member 40. Such features make it possible to easily obtain the robust shock absorbing member 10 in which the connection member 40 in a non-closed loop is hard to come off the tubes 25, 25 each positioned in either end of the shock absorbing member 10.

[Other Embodiments]

As to the mold apparatus 50 of each of the embodiments, the upper mold 52 vertically moves with respect to the lower mold 51. However, the configuration of the mold apparatus 50 is not limited to such a configuration. For example, in the mold apparatus 50, the lower mold 51 may vertically moves with respect to the upper mold 52. Alternatively, the upper mold 52 may move in a fore-aft direction or in a transverse direction with respect to the lower mold 51.

As to the lower mold 51 and the upper mold 52 of the mold apparatus 50 of each of the embodiments, the cavities 53, 53 are in the same size and shape. However, the configuration of the cavities is not limited to such a configuration. Specifically, a cavity 53 may be formed in either one of the lower mold 51 and the upper mold 52.

Moreover, in each of the embodiments, the mold apparatus 50 has only one gate 65; however, the mold apparatus 50 is not limited to such a configuration. Alternatively, the mold apparatus 50 may have multiple gates 65.

Furthermore, as a production method in the embodiments, the shock absorbing member 10 is obtained by injection molding. However, the production method is not limited to injection molding. For example, the shock absorbing member 10 may be produced by polyurethane cast molding. Using the cast molding, a molded polyurethane product is the same in shape as that produced with a metal mold. Note that, in producing the shock absorbing member 10 by cast molding, it is not suitable to use a material which apparently expands due to, for example, foaming after demolding, and to use a molding method causing such expansion.

In the mold apparatus 50 of the first embodiment, the holding components 66, 66 described in the second embodiment are not provided to each of the first housings 61. However, the mold apparatus 50 is not limited to such a configuration. Specifically, in the mold apparatus 50 of the first embodiment, the holding components 66, 66 described in the second embodiment may be provided to each of the first housings 61.

Moreover, in the shock absorbing member 10 of the second embodiment, each of the support members 20 has one tube 25. However, the shock absorbing member 10 is not limited to such a configuration. For example, in the case where the shock absorbing member 10 includes multiple connection members 40, 40, . . . , multiple tubes 25, 25, . . . , may be each provided to an associated one of the support members 20, so that the tubes 25, 25, . . . , correspond in number to the connection members 40, 40, . . . . The point is, as the shock absorbing member 10 of the second embodiment, each of the support members 20 may have at least one tube 25. In producing the shock absorbing member 10 whose support members 20 each have the tubes 25, 25, . . . , the mold apparatus 50 may be appropriately provided with the first housings 61, 61, . . . , capable of housing the tubes 25, 25, . . . .

Furthermore, in the shock absorbing member 10 of the third embodiment, the connection member 40 described in the second embodiment is formed in the non-closed loop. However, the shock absorbing member 10 is not limited to this configuration. For example, as a modification of the shock absorbing member 10 in the third embodiment, the connection member 40 described in the embodiment may be formed in the non-closed loop. In producing the shock absorbing member 10 of such a modification, as seen in the third embodiment, the mold apparatus 50 described in the first embodiment is provided with the retainer molding spaces 67, 67. Then, in the above molding, a thermoplastic resin material to form the connection member 40 is injected toward the retainer molding spaces 67, 67 so that the retainers 41, 41 are each formed on either end of the connection member 40. Such features make it possible to easily obtain the robust shock absorbing member 10 in which the connection member 40 in a non-closed loop is hard to come off the tubes 25, 25 each positioned in either end of the shock absorbing member 10.

Note that the present disclosure is not limited to the embodiment described above, and various changes and modifications may be made without departing from the scope of the present disclosure.

The present disclosure is industrially applicable to, for example, a method for producing a shock absorbing member used for athletic shoes for various sports such as jogging and ball games, sneakers for daily use, and rehabilitation shoes.

What is claimed is:

1. A method for producing a shock absorbing member with a mold apparatus, the shock absorbing member being for a sole of a shoe and including:
   tubes spaced from one another and each having a through hole formed therein; and a connection member inserted in the through hole and laid across the tubes, and connecting the tubes together,
   the mold apparatus including:
   first housings capable of housing the tubes with the tubes spaced from one another;
   molding spaces each formed between the first housings and extending to communicate with the through hole of each of the tubes with the first housings housing the tubes; and
   a gate communicating with the molding spaces,
   the method for producing the shock absorbing member comprising:
   inserting the tubes such that each of the tubes is housed in a corresponding one of the first housings while the mold apparatus is open, and such that when the mold apparatus is closed, the molding spaces and the through holes of each of the tubes are in fluid communication with one another; and
   molding the connection member by heating a thermoplastic resin material and injecting the melted material from the gate toward the molding spaces and through the through hole of each of the tubes, and applying a cooling treatment thereafter to the mold apparatus so that the tubes and the connection member are integrally formed.

2. The method of claim 1, wherein
   the shock absorbing member further includes one support member,
   the support member is integrally formed with the tubes spaced from one another along a circumference of the support member,
   the mold apparatus further includes a second housing for housing the support member, and
   in the inserting, each of the tubes is housed in a corresponding one of the first housings and the support member is housed in the second housing, such that the molding spaces and the tubes communicate with one another.

3. The method of claim 1, wherein
   the shock absorbing member further includes support members,
   the support members are integrally formed with at least one of the tubes,
   the mold apparatus further includes third housings for housing the support members,
   the third housings are arranged in the mold apparatus, and spaced from one another via the molding spaces along a circumference of the mold apparatus, and
   in the inserting, each of the tubes is housed in the corresponding one of the first housings and each of the support members is housed in a corresponding one of the third housings, such that the molding spaces and the tubes communicate with one another.

4. The method of claim 1, wherein
   each of the first housings is provided with holding components capable of holding both ends of a corresponding one of the tubes, and
   in the inserting, each of the tubes is housed in a corresponding one of the first housings while both ends of each of the tubes are held by the holding components, such that the molding spaces and the tubes communicate with one another.

5. The method of claim 1, wherein
   the molding spaces communicate with the tubes and define a closed loop, and
   in the molding, the tubes and the connection member are integrally formed together while the connection member is inserted through the tubes, and formed in a closed loop with ends of the connection member having no seams.

6. The method of claim 1, wherein
   the connection member extends, and is open between the tubes each positioned at one of ends of the shock absorbing member,
   the connection member has ends each having a retainer (i) provided outside of one of the tubes each positioned at one of the ends of the shock absorbing member, and (ii) having an outer diameter larger than an inner diameter of the tubes,
   the mold apparatus further includes retainer molding spaces each provided outside of one of the first housings housing the tubes each positioned at one of the ends of the shock absorbing member, and in the molding, the thermoplastic resin material is injected toward the retainer molding spaces to mold the retainer.

7. The method of claim 1, wherein
the tubes are made of a material higher in rigidity than the thermoplastic resin material.

8. The method of claim 1, wherein
the tubes are made of a material having a melting point higher than a molding temperature of the thermoplastic resin material.

9. The method of claim 2, wherein
the support member is made of a material having a melting point higher than a molding temperature of the thermoplastic resin material.

10. The method of claim 3, wherein
the support members are made of a material having a melting point higher than a molding temperature of the thermoplastic resin material.

11. The method of claim 2, wherein
the support member is made of a material higher in rigidity than the thermoplastic resin material.

12. The method of claim 3, wherein
the support members are made of a material higher in rigidity than the thermoplastic resin material.

\* \* \* \* \*